United States Patent
Schmitz et al.

[11] Patent Number: 5,423,903
[45] Date of Patent: Jun. 13, 1995

[54] AIR FILTER

[76] Inventors: Michael Schmitz; Eugene Ahrenholtz, both of 212 Main Ave., P.O. Box 212, Defiance, Iowa 51527

[21] Appl. No.: 189,463

[22] Filed: Jan. 31, 1994

Related U.S. Application Data

[63] Continuation of Ser. No. 938,500, Aug. 31, 1992, abandoned, which is a continuation of Ser. No. 620,665, Dec. 3, 1990, abandoned.

[51] Int. Cl.[6] .................. B01D 53/04; B01D 46/12
[52] U.S. Cl. ....................... 96/134; 96/147; 55/385.3; 55/499; 55/501; 55/521
[58] Field of Search .......... 96/134, 147; 55/385.2, 55/497, 499, 501, 502, 505, 518, 521

[56] References Cited

U.S. PATENT DOCUMENTS

| | | | |
|---|---|---|---|
| 1,843,446 | 2/1932 | Dräger | 55/387 X |
| 2,055,774 | 9/1936 | Ray | 55/387 |
| 2,195,563 | 4/1940 | Fils | 55/387 |
| 2,400,076 | 5/1946 | Dauster | 55/316 X |
| 2,430,861 | 11/1947 | Carpenter et al. | 55/316 X |
| 2,579,477 | 12/1951 | Dauphinee | 55/387 X |
| 2,589,229 | 3/1952 | Dauphinee | 55/387 X |
| 3,217,471 | 11/1965 | Silverman | 55/316 |
| 3,319,401 | 5/1967 | Bogardus | 55/387 |
| 3,430,420 | 3/1969 | Gross | 55/387 |
| 3,577,710 | 5/1971 | Feldman | 55/387 X |
| 3,630,007 | 12/1971 | Neumann | 55/387 |
| 3,727,597 | 4/1973 | Hensler | 55/316 X |
| 4,418,662 | 12/1983 | Engler et al. | 55/387 X |
| 4,514,197 | 4/1985 | Armbruster | 55/385.2 X |
| 4,784,048 | 11/1988 | Nelson | 55/385.2 X |
| 4,917,862 | 4/1990 | Kraw et al. | 55/387 X |
| 5,129,929 | 7/1992 | Linnersten | 55/316 X |

Primary Examiner—Robert Spitzer

[57] ABSTRACT

An air filter for use in filtering air entering an operator's cab of a human-operated machine. A fine mesh screen and air permeable fibrous cover are added to the air outlet side of a conventional air filter. An accordion-shaped filter element of the conventional filter is located upstream of the fine mesh screen. Granular filter material such as activated charcoal fills the space between the accordion-shaped filter element and the fibrous cover. An air-impermeable strip may be added at the top portion of the fine-mesh screen across the full width of the air filter to prevent air from flowing through a void in the granular filter material which may develop over time due to settling.

3 Claims, 3 Drawing Sheets

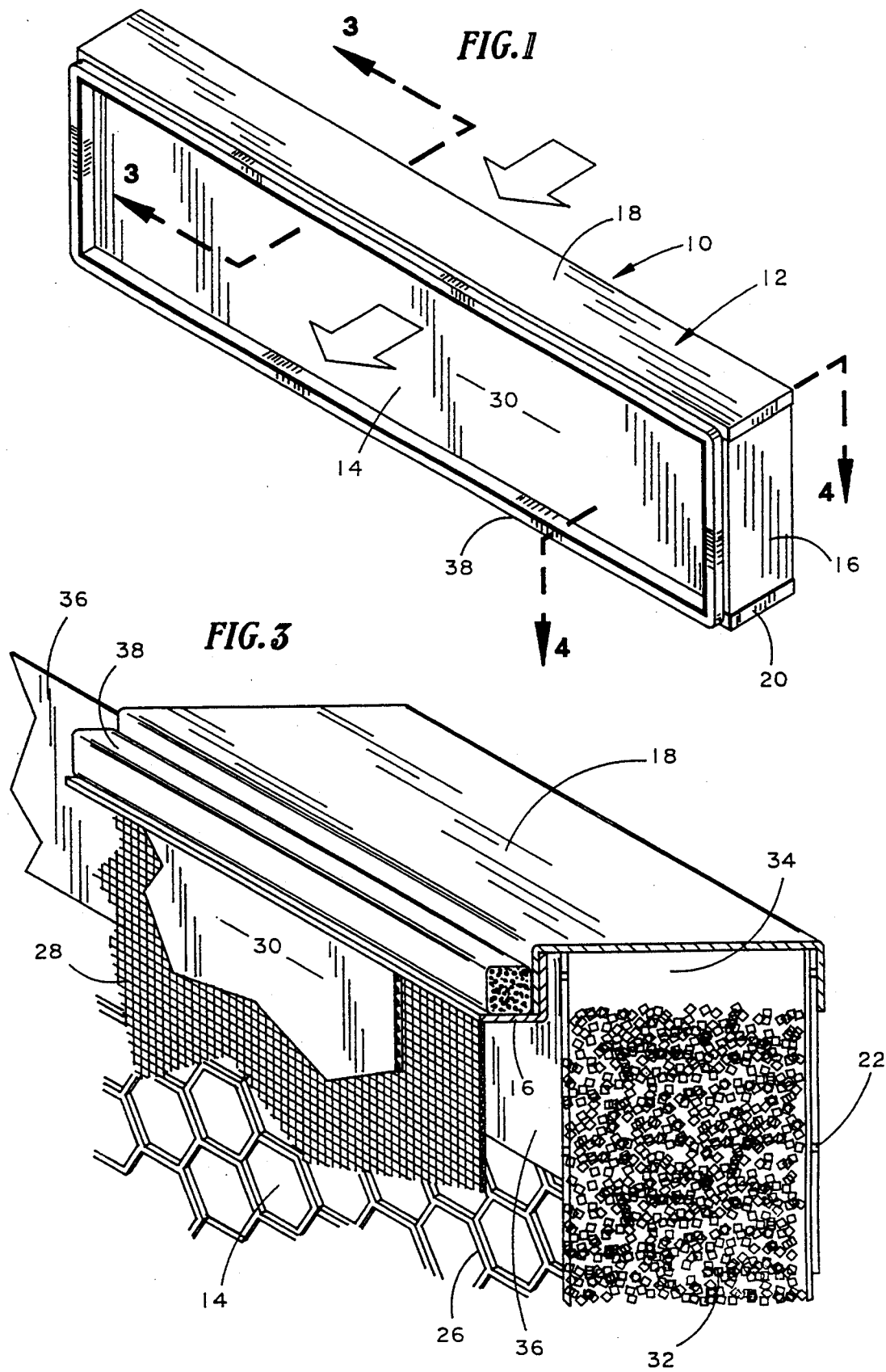

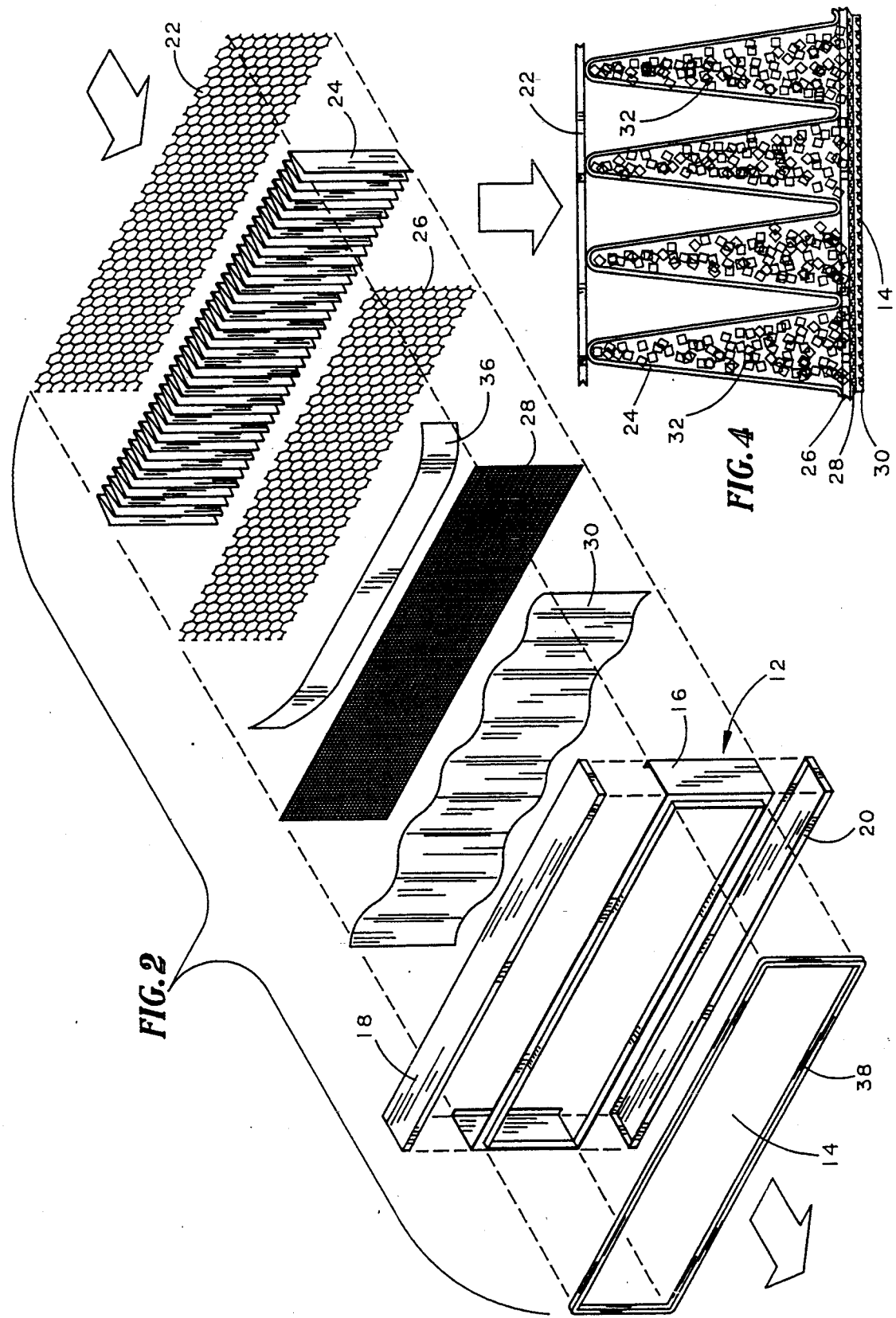

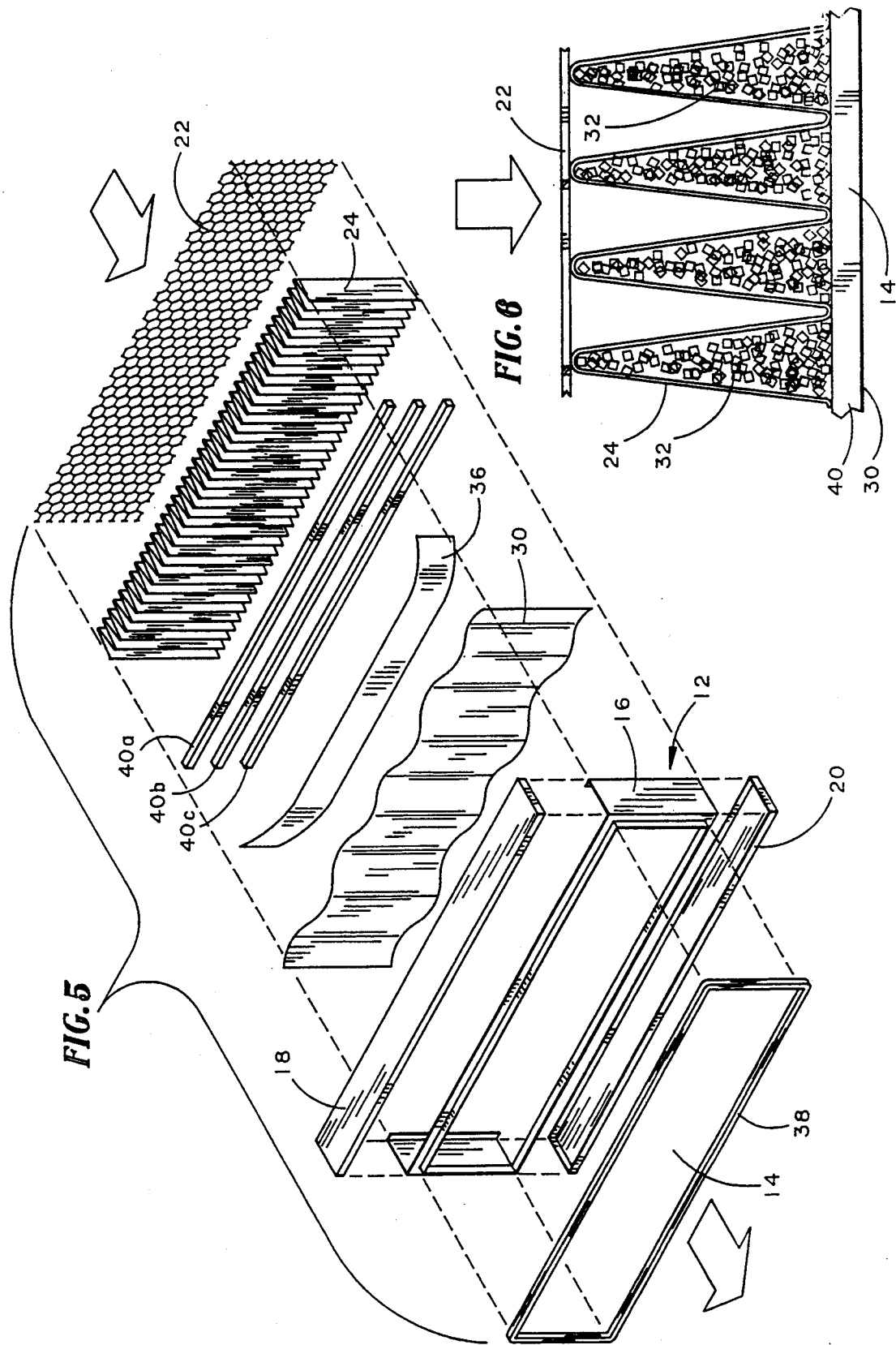

AIR FILTER

This application is a continuation of U.S. patent application Ser. No. 07/938,500 filed Aug. 31, 1992 (abandoned), which is a continuation of application Ser. No. 07/620,665 filed Dec. 3, 1990 (abandoned).

BACKGROUND OF THE INVENTION

The invention relates generally to air filters and, more specifically, to a machine operator cab that is constructed by modifying a commercially available air filter for the cab.

It has become common to equip human operated machinery with enclosed operator cabs, particularly machinery used in dusty, dirty or under other contaminated conditions. The cabs are meant to protect the operator from the adverse conditions in the environment of the machinery. Of course, outside air must be circulated into the cab during operation of the machinery. Such air is filtered to remove a portion of airborne particulate contaminants, most typically dust and vegetative matter.

Such machinery is in wide usage in modern agricultural practices. Many such practices generate considerable quantities of airborne particulates with the result that cab filters quickly become clogged with trapped materials and must be frequently replaced. Certain agricultural practices, moreover, involve the application of hazardous chemical herbicides, fertilizers, and pesticides which become airborne contaminants that are not removed by the typical mechanical filters used for trapping particulates.

SUMMARY OF THE INVENTION

The invention consists of an air filter for trapping airborne particulates and filtering certain gaseous chemical contaminants. A main frame has a coarse air inlet screen, a coarse air outlet screen and an accordion-shaped fibrous filter located therebetween. Granular filter material fills substantially the folds of the accordion-shaped filter between the filter and the outlet screen. A fine mesh, air-permeable screen overlies the outlet screen to help prevent the release of the granular filter material. An air-permeable, fibrous cover overlies the fine mesh screen to help prevent the release of granular filter material that may have broken down into powder. An air-impermeable strip is interposed between the fine mesh screen and the air outlet screen across a top portion of the full width of said main frame so that air passing through the air filter will be forced through said granular filter material regardless of settling of the material during the life of the air filter.

BRIEF DESCRIPTION OF THE DRAWINGS

FIG. 1 is a perspective view of the air filter of the present invention;

FIG. 2 is an exploded perspective view of the air filter;

FIG. 3 is an enlarged cross-sectional view taken along line 3—3 of FIG. 1;

FIG. 4 is an enlarged cross-sectional view taken along line 4—4 of FIG. 1;

FIG. 5 is an exploded perspective view of a second embodiment of the air filter; and FIG. 6 is an enlarged cross-sectional view of the second preferred embodiment.

DETAILED DESCRIPTION OF A PREFERRED EMBODIMENT

Illustrated in FIG. 1, generally at 10, is an air filter for use in filtering air to an operator cab of a piece of human operated machinery such as a tractor, earth moving machine, combine, or the like. The air filter 10 is mounted horizontally, vertically or at an inclined position, most typically inclined at approximately 30 degrees. Air enters the filter from the air inlet side on the back or hidden side of the air filter 10 as illustrated in FIG. 1. After passing through the air filter 10, filtered air exits from the air outlet side 14, flowing in general in the direction of the arrows of FIG. 1.

As best illustrated in FIG. 2, the air filter 10 includes a main frame 12 which has an outlet and side section 16, a top section 18, and a bottom section 20. The principle elements of the air filter 10 are located within the main frame 12 in layers. Beginning at the inlet side of the air filter 10 is a coarse mesh screen 22, followed by an accordion-shaped fibrous filter element 24, and then a second coarse mesh screen 26. A fine mesh screen 28 overlies the second coarse mesh screen 26 and is in turn covered by a fibrous filter element 30.

As illustrated in FIGS. 3 and 4, the folds of the accordion-shaped filter element 24 between the second coarse mesh screen 26 and fine mesh screen 28 are substantially filled with a granular filter material 32 which, in the preferred embodiment, is activated charcoal. The mesh of the fine mesh screen 28 is sufficiently small to prohibit the release of all but the smallest fines of the granular material 32. The fibrous material of the accordion-shaped filter element 24 and the filter element 30 serve to retain the granular filter material 32 inside of the air filter 10.

In constructing the air filter 10, the granular material fills the folds of the accordion-shaped filter element 24 and is vibrated to reduce the volume of the granular filter material 32 so as to more completely fill the folds of the filter element 24 and help to prevent settling of the granular filter material 32 during operation of the machinery on which the air filter 10 has been installed. Although the manufacturing techniques used with the air filter 10 are intended to prevent settling of the granular filter material, it has been found that some additional settling may occur during operation of the machinery. If sufficient settling occurs, a space void of granular material 32, as illustrated in FIG. 3 at 34, may develop. If this should occur, it is possible that a substantial portion of the air flowing through the air filter 10 would not pass through the granular filter material 32 before entering the operator's cab.

To accommodate some settling of the granular filter material 32 over time, an air-impermeable strip 36 is interposed between the second coarse mesh screen 26 and the fine mesh screen 28 across a top portion and extending over the full width of the main frame 12. In the preferred embodiment, the air-impermeable strip 36 is a piece of one-sided adhesive tape that is adhered to the upstream side of the fine mesh screen 28. The thickness of the strip 36 is sufficient to extend beyond any void 34 that may develop but does not substantially interfere with the area of the air filter 10 through which air may pass.

In use, the air filter 10 is installed in a housing therefor in a wall of the operator's cab. A gasket 38 serves to seal the air filter 10 inside the housing so that any air entering the operator's cab must pass through the air filter 10.

The fibrous material of the accordion-shaped filter element 24 serves to trap airborne particulate contaminants in the air stream passing through the air filter 10. The activated charcoal 32 will absorb a great many of the hazardous organic chemicals that may be present in the air stream as a result of contamination of the air in the immediate environment of the operator's cab due to overspray, evaporation, and the like. The air filter 10, thus, functions both to trap airborne particulates and to filter out non-particulate, gaseous contaminants that would otherwise pass through commercially available filters.

One feature of the accordion geometry of the filter element 24 is that initially air flow will be greatest in the valleys of the filter element 24 where the thickness of the granular material 32 is the least. Particulates will, accordingly preferentially accumulate in these areas so that, over time, the air flow will be through larger distances of the granular material 32. The filter element 24 is self-cleaning to a certain degree in that vibration of the machinery on which the filter 10 is mounted will shake loose some of the accumulated particulates. Additionally, the particles of activated charcoal 32 are agitated by the vibration of the machinery and will impact the filter element 24 to enhance the cleaning effect. Air being forced through the filter 10 during operation will have a fluidizing effect on the activated charcoal 32 which will increase the agitation of the particles and further enhance the cleaning effect.

In the second preferred embodiment, three longitudinal retaining bars 40a-c (FIGS. 5 and 6) replace the second coarse mesh screen 26 and the fine mesh screen 28 (FIGS. 2–4). The retaining bars 40a-c hold the accordion filter element 24 in place to perform the same function as the screens 26 and 28.

Existing commercial air filters are available which are made up of the main frame 12, the coarse screens 22 and 26, and the accordion-shaped filter element 24. In converting the commercially available air filters into an air filter 10 of the present invention, the fibrous air filter element 30, the fine mesh screen 28, and the air-impermeable strip 36 are added (or the retaining bars 40a-c are used) and the downstream folds of the accordion-shaped filter element 24 are filled with activated charcoal. The modified air filter will still fit as a replacement for the commercially available air filter but will instead function with the added features of the present invention. Additional repair of the modified filters is also anticipated. Such repair includes replacement of the accordion-shaped filter element 24, the granular filter material 32, the screens 26 and 28 (or the retaining bars 40a-c) and the fibrous filter element 30, all of which can be accomplished without direct contact with the granular filter material 32.

We claim:
1. A self-cleaning air filter, comprising:
   (a) a main frame having an air inlet and an air outlet;
   (b) an accordion-shaped, air permeable fibrous filter located within said main frame;
   (c) granular filter material substantially filling the folds of said accordion filter;
   (d) a structural member contiguous with said accordion filter and contiguous with said granular filter material; and
   (e) an air-permeable fibrous filter contiguous with said structural member.
2. The air filter as defined in claim 1, wherein an air-impermeable strip is interposed between a portion of said accordion filter and a portion of said structural member.
3. An air filter as defined in claim 1, wherein an air-impermeable strip is interposed between a portion of said accordion filter and a portion of said air-permeable fibrous filter.

* * * * *